E. F. WIEDERHOLDT.
LINK CHAIN.
APPLICATION FILED JULY 15, 1920.
1,382,703. Patented June 28, 1921.
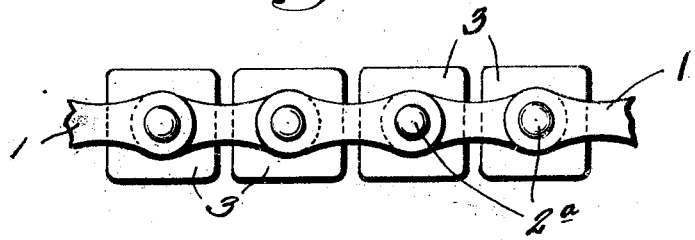
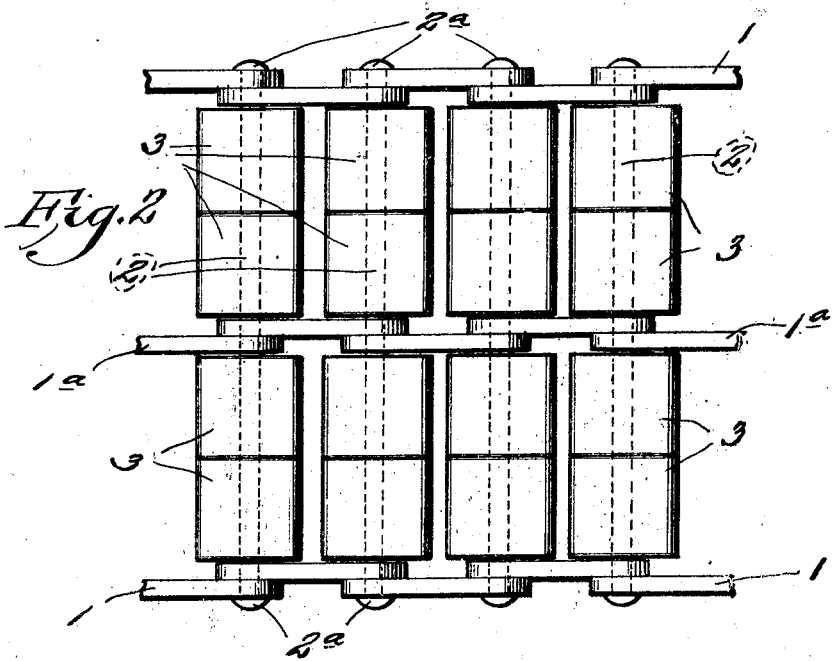
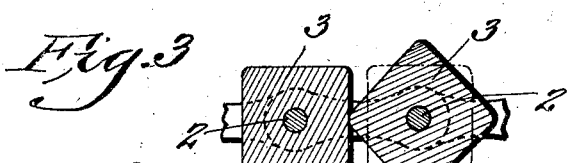
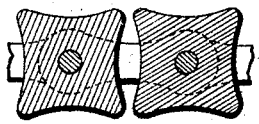
Inventor
Ernest F. Wiederholdt

UNITED STATES PATENT OFFICE.

ERNEST F. WIEDERHOLDT, OF ST. LOUIS, MISSOURI.

LINK CHAIN.

1,382,703.  Specification of Letters Patent.  Patented June 28, 1921.

Application filed July 15, 1920. Serial No. 396,608.

*To all whom it may concern:*

Be it known that I, ERNEST F. WIEDERHOLDT, a citizen of the United States, residing at St. Louis, Missouri, have invented a certain new and useful Improvement in Link Chains, of which the following is a full, clear, and exact description, such as will enable others skilled in the art to which it appertains to make and use the same, reference being had to the accompanying drawings, forming part of this specification, in which—

Figure 1 is a side elevational view of my improved link chain.

Fig. 2 is a top plan view of the same.

Fig. 3 is a diagrammatic view illustrating the manner of adjusting the filler blocks to obtain new wearing surfaces.

Fig. 4 is a modified form of filler block.

This invention relates to a new and useful improvement in link chains, the object being to construct a chain of the character described whose filler blocks are adjustable whereby they may be turned to present one of several flat or concave wearing surfaces to the pulley or other surface with which they come in contact.

In the drawings, 1 indicates the links of a chain which may be of any desired shape, said links being connected together by pins or pintle bars 2. In the simplest form of construction, these bars 2 have their ends upset on the outside of the links so as to form rivet heads 2ª. 3 indicates the spacing or filler blocks which may be of any suitable material, preferably leather, fiber or some composition which is slightly compressible or flexible. These filler blocks are essentially rectangular in cross-section and, depending on the desired width of the chain, there may be one, two or more filler blocks strung on a pintle rod 2 between the links 1 and, where the chain is wide, as shown in Fig. 2, reinforcing links 1ª may be employed at some point, or points, between the filler blocks.

The corners of these filler blocks are preferably slightly rounded, this rounding being for the purpose of enabling them to be rotated on the pintle bars 2 when they are adjusted to present new wearing surfaces. The adjacent filler blocks are preferably of such size that they cannot freely rotate on the pintle bars, their corners preventing this, but by the exertion of a slight pressure, these corners may be forced past the faces of the adjacent blocks when it is desired to present a new flat surface for wear.

Should these filler blocks become slightly tilted or cocked in service, their contact with the face of the wheel, or other surface, with which they coöperate will tend to restore them to their normal operative position.

In Fig. 4 I have shown the faces of the filler blocks as slightly concave, which enables them to be more closely grouped together, and at the same time, have a greater surface contact with the periphery of the wheel or pulley over which it passes.

What I claim is:

1. A chain composed of links pivotally connected together by pintle bars, and substantially rectangular spacer blocks mounted on said pintle bars and capable of rotatable adjustment thereon, whereby new wearing faces may be presented for action.

2. A chain composed of links, pintle bars and spacer blocks, the latter being substantially rectangular, the engaging surfaces of which are capable of being successively presented for action by rotatably adjusting said blocks on said bars.

3. A chain composed of links, pintle bars and flexible filler blocks, the latter being substantially rectangular in shape and being capable of rotation under pressure on said pintle bars, whereby new surfaces are presented for action.

4. A chain involving in its construction pintle bars, and means for spacing said pintle bars apart, and substantially rectangular spacer blocks having angularly disposed wearing surfaces, said spacer blocks being independently rotatably adjustable on said pintle bars, whereby new wearing surfaces may be turned to position for action.

In testimony whereof I hereunto affix my signature this 28th day of June, 1920.

ERNEST F. WIEDERHOLDT.